(12) United States Patent
Lim (10) Patent No.: US 12,084,222 B2
(45) Date of Patent: Sep. 10, 2024

(54) COSMETIC CONTAINER AND MANUFACTURING METHOD THEREOF

(71) Applicant: Jong Su Lim, Pocheon-si (KR)

(72) Inventor: Jong Su Lim, Pocheon-si (KR)

( * ) Notice: Subject to any disclaimer, the term of this patent is extended or adjusted under 35 U.S.C. 154(b) by 26 days.

(21) Appl. No.: 17/850,461

(22) Filed: Jun. 27, 2022

(65) Prior Publication Data

US 2023/0192345 A1 Jun. 22, 2023

(30) Foreign Application Priority Data

Dec. 22, 2021 (KR) .......................... 10-2021-0184663

(51) Int. Cl.
| | |
|---|---|
| *B65D 1/02* | (2006.01) |
| *B29D 22/00* | (2006.01) |
| *B65D 23/00* | (2006.01) |
| *B65D 25/20* | (2006.01) |
| *B65D 25/34* | (2006.01) |
| *B65D 81/02* | (2006.01) |

(52) U.S. Cl.
CPC ......... *B65D 1/0276* (2013.01); *B29D 22/003* (2013.01); *B65D 1/0246* (2013.01); *B65D 23/00* (2013.01); *B65D 25/20* (2013.01); *B65D 25/34* (2013.01); *B65D 81/02* (2013.01); *B65D 81/022* (2013.01)

(58) Field of Classification Search
CPC .. B65D 1/0276; B65D 1/0261; B65D 1/0246; B65D 81/02; B65D 81/022; B65D 25/20; B65D 25/34; B65D 23/00; A45D 40/00; A45D 34/00

See application file for complete search history.

(56) References Cited

U.S. PATENT DOCUMENTS 10,954,022 B2 * 3/2021 Hatakeyama ........... B29C 49/22
2021/0387777 A1 * 12/2021 Maurin .................... B65D 1/06

FOREIGN PATENT DOCUMENTS

| JP | 2014046979 A | 3/2014 |
|---|---|---|
| JP | 2014169096 A | 9/2014 |
| KR | 200384766 Y1 | 5/2005 |
| KR | 200387285 Y1 | 6/2005 |
| KR | 1020090065146 A | 6/2009 |
| KR | 101448957 B1 | 10/2014 |
| KR | 20150001417 U | 4/2015 |

(Continued)

*Primary Examiner* — Nathan J Jenness
*Assistant Examiner* — Jennifer Castriotta
(74) *Attorney, Agent, or Firm* — NKL LAW; Jae Youn Kim (57) ABSTRACT

Provided is a cosmetic container including: a side surface member that forms a closed curved surface shielded from an outside so as to form a reception space; a top surface member formed integrally with the side surface member on an upper portion of the side surface member, the top surface member including a cap coupling part protruding from a center region of the top surface member; and a bottom member disposed on a lower portion of the side surface member so as to be fixed to the side surface member. The bottom member is drawn inward of the side surface member, and an overlapping member that overlaps the bottom member is formed by a double injection scheme to allow the side surface member to surround a bottom surface of the bottom member, so that the bottom member and the side surface member are integrally bonded.

5 Claims, 6 Drawing Sheets

(56) References Cited

FOREIGN PATENT DOCUMENTS

| | | |
|---|---|---|
| KR | 101520448 B1 | 5/2015 |
| KR | 1020160033400 A | 3/2016 |
| KR | 1020160124487 A | 10/2016 |
| KR | 1020190117061 A | 10/2019 |
| KR | 102042978 B1 | 11/2019 |
| KR | 1020190128107 A | 11/2019 |
| KR | 1020200144304 A | 12/2020 |
| KR | 102334654 B1 | 12/2021 |

* cited by examiner

COSMETIC CONTAINER AND MANUFACTURING METHOD THEREOF

BACKGROUND OF THE INVENTION

1. Field of the Invention

The present invention relates to a cosmetic container and a manufacturing method thereof, and more particularly, to a cosmetic container and a manufacturing method thereof, in which a bottom surface of the cosmetic container for storing a cosmetic product is formed firmly and integrally with a side surface of the cosmetic container, and rigidity of the bottom surface is improved so that the bottom surface is prevented from being damaged even when the cosmetic container is accidentally dropped, and thus the cosmetic product may be permanently received in the cosmetic container, which improves user satisfaction.

2. Description of the Related Art

In general, plastic containers, including cosmetic containers, have been widely known as being manufactured mainly by a hollow molding scheme (blow molding scheme).

The containers molded by the hollow molding scheme have very monotonous forms and shapes, which lack a visual effect. In particular, according to blow molding, due to a limitation on a thickness, it is difficult to change an outer shape, and a visual appearance is inferior.

In addition, while cosmetic containers (eyeliners, mascaras, lipsticks, eyeshadows, etc.) that are mainly and frequently used by women strongly require decorative aspects in addition to functionality, the blow molding is restricted to a simple cylindrical shape, so that merchantability may not be increased.

Further, since a conventional cosmetic container is manufactured by the hollow molding scheme, a bottom surface and a side surface of the cosmetic container are generally formed integrally with each other. Accordingly, it is impossible to provide a separate device for reinforcing the bottom surface in a process of manufacturing the cosmetic container, so that the bottom surface may be easily damaged to allow contents to leak to an outside when a cosmetic product is dropped.

SUMMARY OF THE INVENTION

To solve the problems described above, an object of the present invention is to provide a cosmetic container and a manufacturing method thereof, in which a bottom surface of the cosmetic container for storing a cosmetic product is formed firmly and integrally with a side surface of the cosmetic container, and rigidity of the bottom surface is improved so that the bottom surface is prevented from being damaged even when the cosmetic container is accidentally dropped, and thus the cosmetic product may be permanently received in the cosmetic container, which improves user satisfaction.

To achieve the objects of the present invention described above, there is provided a cosmetic container including: a side surface member that forms a closed curved surface shielded from an outside so as to form a predetermined reception space for receiving a cosmetic product; a top surface member formed integrally with the side surface member on an upper portion of the side surface member, and including a cap coupling part protruding from a center region of the top surface member so as to be coupled with a cap; and a bottom member disposed on a lower portion of the side surface member so as to be fixed to the side surface member so that the reception space is shielded from the outside, wherein the bottom member is drawn inward of the side surface member by a predetermined interval, and an overlapping member that overlaps the bottom member is formed by a double injection scheme to allow the side surface member to surround a bottom surface of the bottom member, so that the bottom member and the side surface member are integrally bonded.

In this case, the overlapping member may be provided on a side surface thereof with a tapered surface, which has a width that is gradually narrowed toward a lower side of the overlapping member and has an outer surface that is curved, and a lower inner surface of the side surface member and the tapered surface may be bonded to each other.

In addition, a fixing sill into which a fixing bar for fixing the bottom member when the bottom member and the side surface member are bonded to each other is inserted may protrude from a center region of the bottom member.

Further, a reinforcing rib having a grid shape may protrude by a predetermined height from a top surface of the bottom member except for an inside of the fixing sill.

Furthermore, an extension part extending by a predetermined height in a height direction of the bottom member may be provided on a periphery of a top surface of the bottom member.

In addition, a separate reinforcing part having one side surface making contact with an inner surface of the extension part and an opposite side surface making contact with the top surface of the bottom member may be formed on the inner surface of the extension part.

Further, a fastening groove may be recessed on a periphery of the bottom surface of the bottom member, and a fastening protrusion inserted into the fastening groove may protrude from a periphery of a top surface of the overlapping member.

Furthermore, a separate filling resin material may be applied to a top surface of the bottom member so that the top surface of the bottom member is smooth.

In addition, the top surface of the bottom member to which the filling resin material is applied may be inclined downward toward a center region of the bottom member.

To achieve the objects of the present invention described above, there is provided a method of manufacturing a cosmetic container, the method including: a first step of molding a side surface member and a top surface member such that a reception space is formed by using a hollow molding scheme; a second step of allowing a fixing bar provided in a molding device to pass through a cap coupling part so as to be inserted into a fixing sill of a bottom member to fix the bottom member; a third step of arranging the side surface member such that a tapered surface of the bottom member makes contact with a lower inner surface of the side surface member while the bottom member is fixed; and a fourth step of forming an overlapping member by a double injection scheme so that the bottom member and the side surface member are bonded to each other.

In this case, a step of separating the fixing bar from the fixing sill and allowing the cosmetic container, which has been molded, to be removed from the molding device may be performed after the fourth step.

As described above, according to the cosmetic container and the manufacturing method thereof of the present invention, the bottom surface of the cosmetic container for storing the cosmetic product may be formed firmly and integrally with the side surface of the cosmetic container, so that the bottom surface can be prevented from being separated from the side surface of the cosmetic container.

In addition, the rigidity of the bottom surface of the cosmetic container may be improved so that the bottom surface can be prevented from being damaged even when the cosmetic container is accidentally dropped, and thus the cosmetic product can be permanently received in the cosmetic container, which improves user satisfaction.

Further, unlike a conventional hollow molding scheme, various printing schemes can be implemented on a surface of the cosmetic container.

Furthermore, since an entire cosmetic container is molded by using the same material, inconvenience of separating a body and a cap to separately collect the body and the cap after the cosmetic container is used up can be omitted.

In addition, since contents received inside the cosmetic container are designed to collect in a center region of the bottom surface, the contents can be drawn out with a pump so as to be completely used up without leaving any residue.

Further, while a conventional tubular container has a flat bottom so that the container may not be erected by using the bottom, the cosmetic container according to the present invention can be erected upright by using a cap part and erected by using a flat bottom formed by the double injection scheme, so that convenience of use can be improved.

DETAILED DESCRIPTION OF THE INVENTION

Hereinafter, a cosmetic container and a manufacturing method thereof according to one embodiment of the present invention will be described in more detail with reference to the accompanying drawings.

Figure 1:
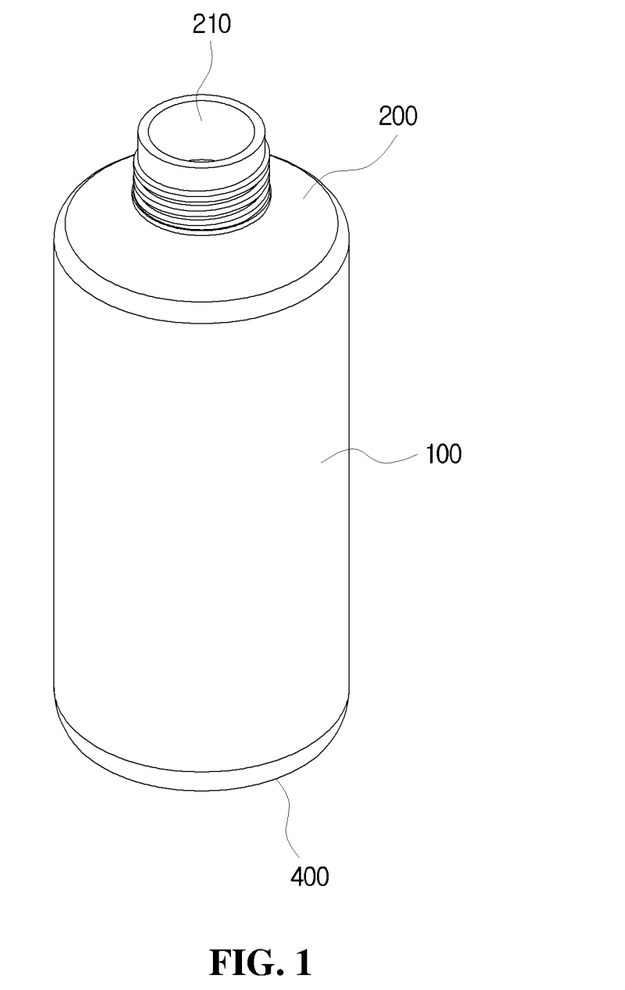
FIG. 1 is a perspective view showing a structure of a cosmetic container according to one embodiment of the present invention.
Figure 2:
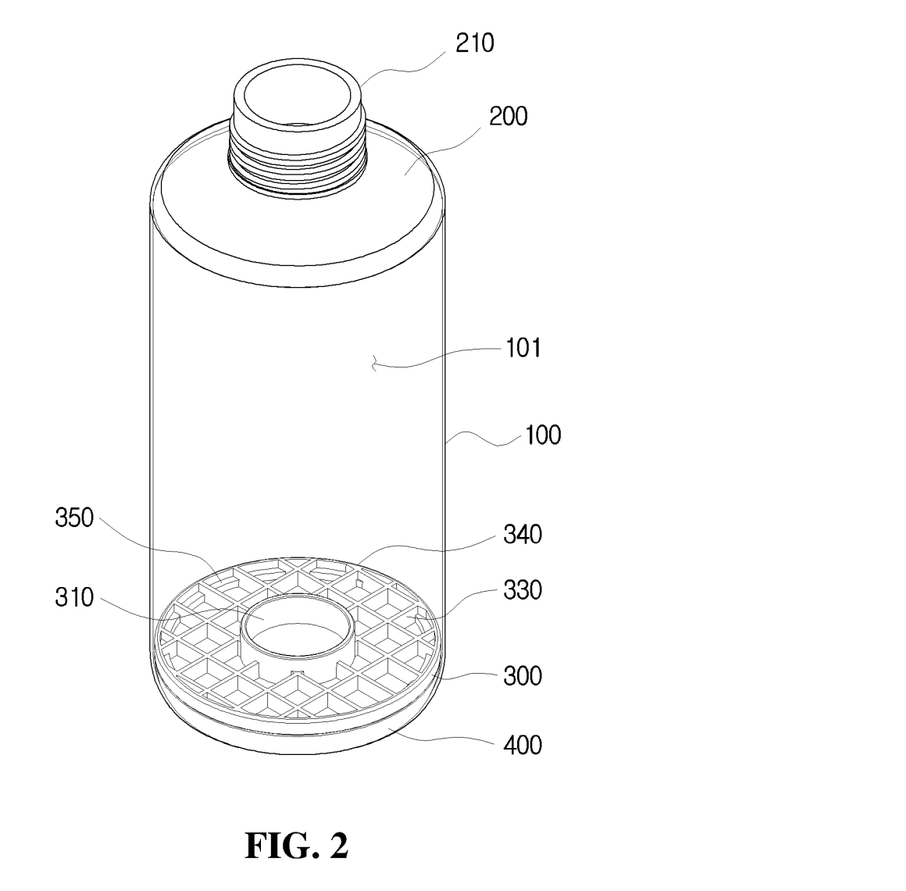
FIG. 2 is a perspective view showing an inner structure of the cosmetic container according to one embodiment of the present invention.
Figure 3:
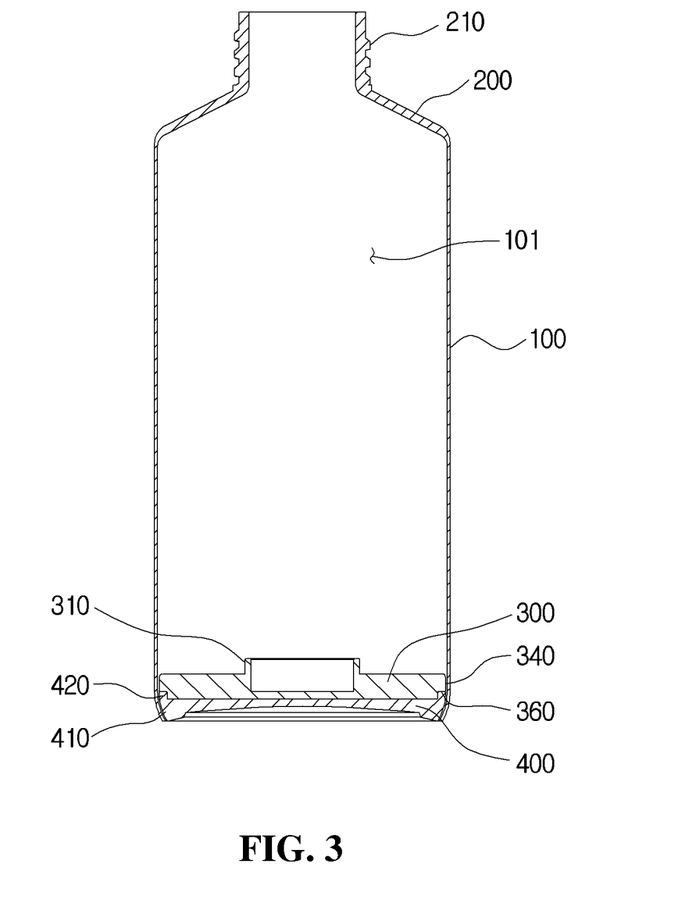
FIG. 3 is a longitudinal sectional view showing the structure of the cosmetic container according to one embodiment of the present invention.
Figure 4:
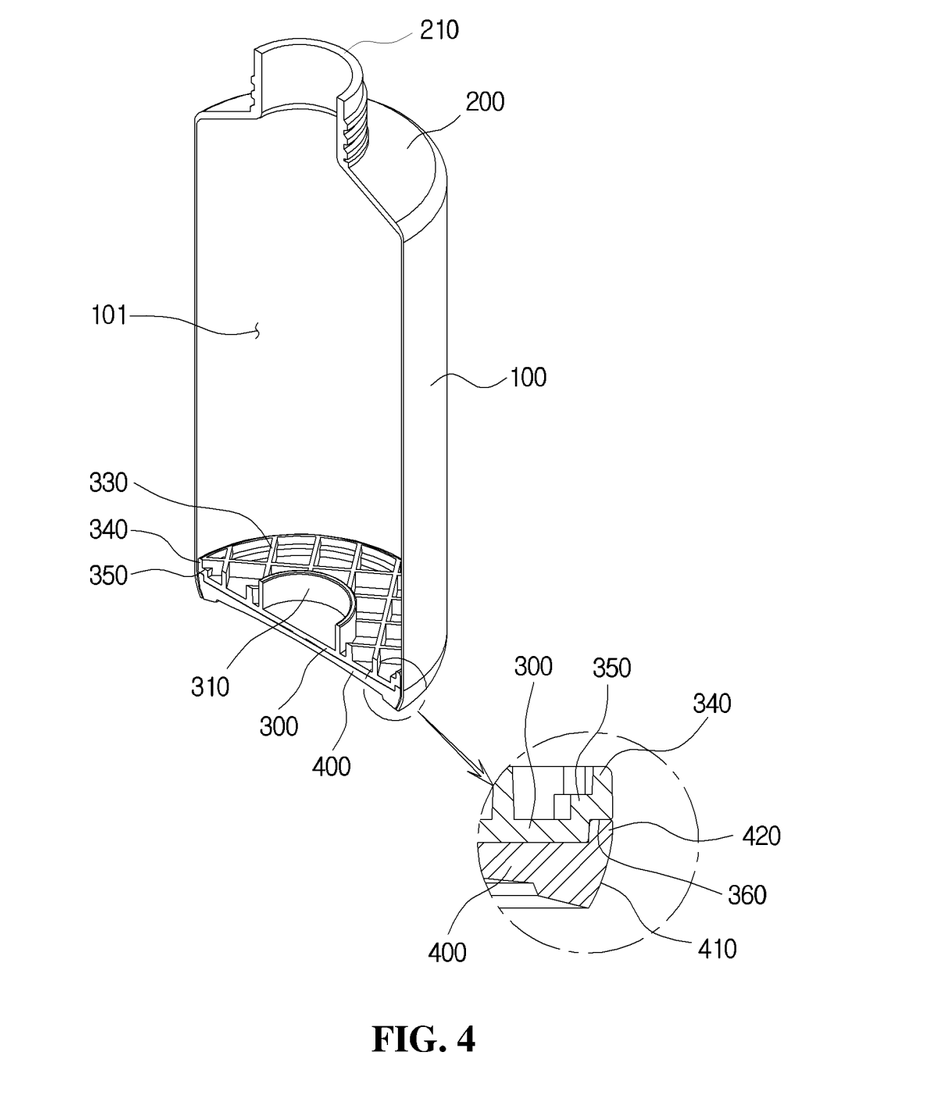
FIG. 4 is a cutaway perspective view showing the structure of the cosmetic container according to one embodiment of the present invention.
Figure 5:
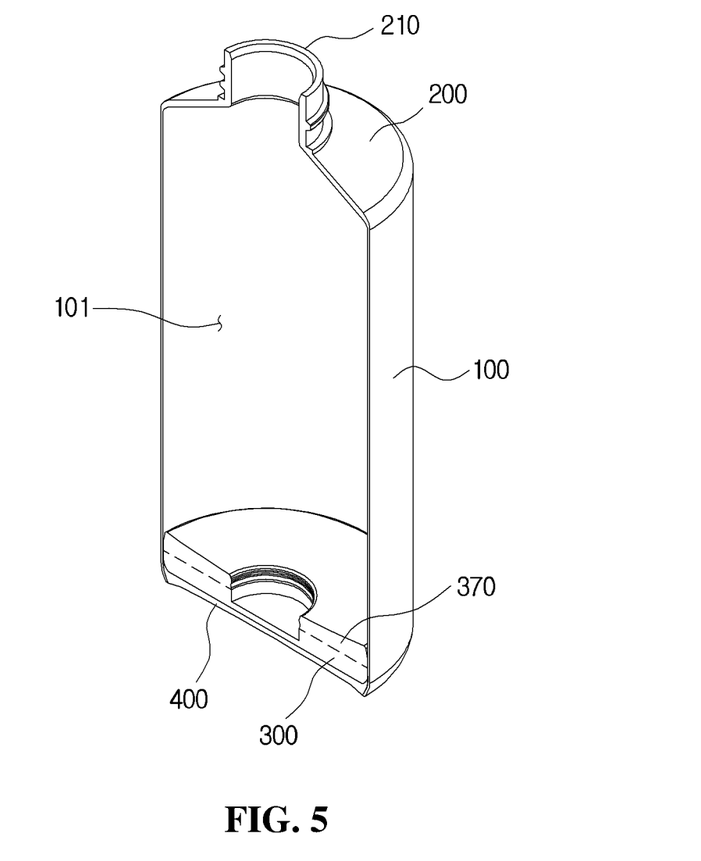
FIG. 5 is a cutaway perspective view showing a structure of a cosmetic container according to another embodiment of the present invention.
Figure 6:
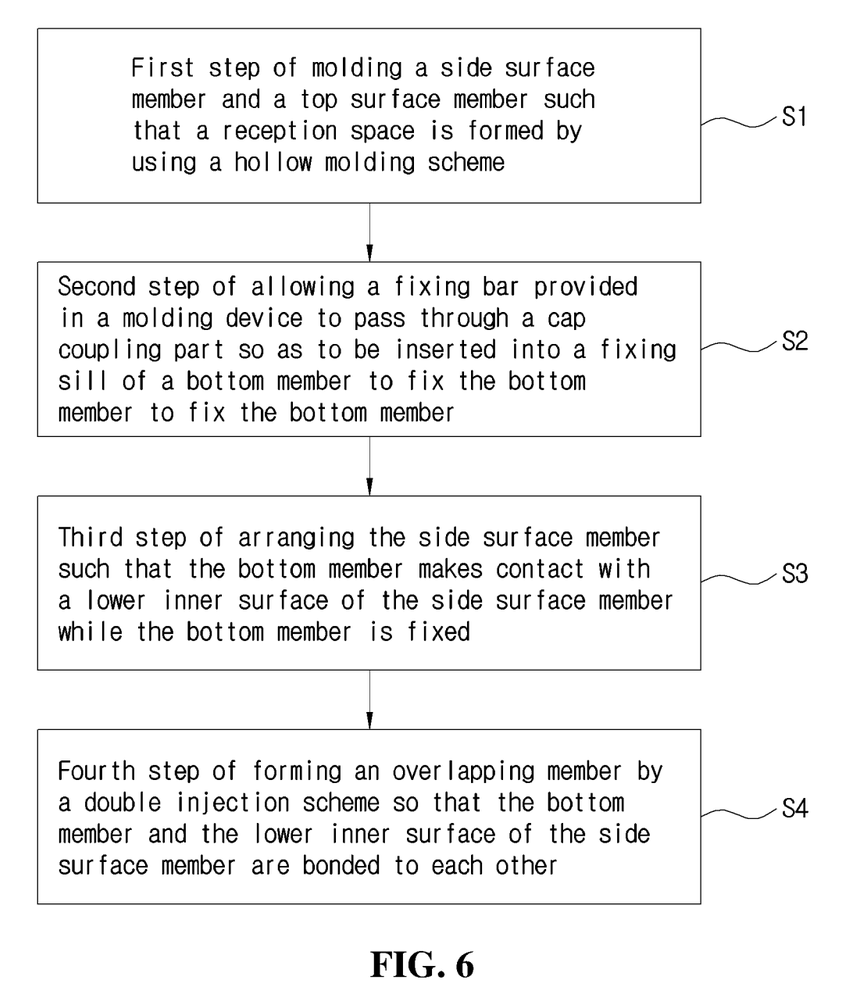
FIG. 6 is a flowchart for sequentially describing a method of manufacturing a cosmetic container according to one embodiment of the present invention.

FIG. 1 is a perspective view showing a structure of a cosmetic container according to one embodiment of the present invention, FIG. 2 is a perspective view showing an inner structure of the cosmetic container according to one embodiment of the present invention, FIG. 3 is a longitudinal sectional view showing the structure of the cosmetic container according to one embodiment of the present invention, FIG. 4 is a cutaway perspective view showing the structure of the cosmetic container according to one embodiment of the present invention, FIG. 5 is a cutaway perspective view showing a structure of a cosmetic container according to another embodiment of the present invention, and FIG. 6 is a flowchart for sequentially describing a method of manufacturing a cosmetic container according to one embodiment of the present invention.

As shown in FIGS. 1 to 4, according to one embodiment of the present invention, a cosmetic container may include: a side surface member 100 that forms a closed curved surface shielded from an outside so as to form a predetermined reception space 101 for receiving a cosmetic product; a top surface member 200 formed integrally with the side surface member 100 on an upper portion of the side surface member 100, and including a cap coupling part 210 protruding from a center region of the top surface member 200 so as to be coupled with a cap; and a bottom member 300 disposed on a lower portion of the side surface member 100 so as to be fixed to the side surface member 100 so that the reception space 101 is shielded from the outside, wherein the bottom member 300 is drawn inward of the side surface member 100 by a predetermined interval, and an overlapping member 400 that overlaps the bottom member 300 is formed by a double injection scheme to allow the side surface member 100 to surround a bottom surface of the bottom member 300, so that the bottom member 300 and the side surface member 100 are integrally bonded.

The side surface member 100 refers to a member that forms a side surface of the cosmetic container, in which a plate surface of the side surface member 100 may be curved to form the closed curved surface, and the reception space 101 may be provided inside the side surface member 100 to receive the cosmetic product.

The top surface member 200 may be formed integrally with the side surface member 100 on the upper portion of the side surface member 100 so that the reception space 101 may be shielded from the outside, and the cap coupling part 210 having a hollow to allow the cosmetic product received in the cosmetic container to be selectively discharged to the outside for use may protrude from the center region of the top surface member 200.

A screw thread may protrude from an outer surface of the cap coupling part 210 so as to engage with a screw thread formed on an inner surface of a cap (not shown) so that the cap (not shown) may be screw-coupled to the cap coupling part 210.

The bottom member 300 refers to a member that is disposed on the lower portion of the side surface member 100 so as to be fixed to the side surface member 100 so that the reception space 101 may be shielded from the outside, in which the bottom member 300 may have a peripheral shape corresponding to a shape of a longitudinal section of the side surface member 100.

Since the peripheral shape of the bottom member 300 corresponds to the shape the longitudinal section of the side surface member 100, a side surface of the bottom member 300 may make close contact with a lower inner surface of the side surface member 100 so that the lower inner surface of the side surface member 100 and the side surface of the bottom member 300 may be easily bonded to each other by the double injection scheme.

In addition, a fixing sill 310 into which a fixing bar for fixing the bottom member 300 when the bottom member 300 and the side surface member 100 are bonded to each other is inserted may protrude from a center region of the bottom member 300.

The fixing sill 310 may serve to allow the fixing bar to be inserted into the fixing sill 310 so as to fix the bottom member 300, so that the bottom member 300 may be prevented from fluctuating when the bottom member 300 is bonded to a bottom surface of the side surface member 100 by the double injection scheme, and thus the lower inner surface of the side surface member 100 may accurately make contact with the side surface of the bottom member 300.

A reinforcing rib 330 having a grid shape may protrude by a predetermined height from a top surface of the bottom member 300 except for an inside of the fixing sill 310, so that rigidity of the bottom member 300 may be increased, and thus the bottom member 300 may be prevented from being damaged by an external force.

In addition, an extension part 340 extending by a predetermined height in a height direction of the bottom member 300 may be provided on a periphery of the top surface of the bottom member 300 so that a tapered surface 410 of an overlapping member 400 that will be described below may extend.

The extension part 340 may serve to firmly bond the bottom member 300 to the side surface member 100 by increasing a contact area between the side surface of the bottom member 300 and the lower inner surface of the side surface member 100.

In addition, a separate reinforcing part 350 having one side surface making contact with an inner surface of the extension part 340 and an another side surface making contact with the top surface of the bottom member 300 may be formed on the inner surface of the extension part 340, so that even when an external force is applied, the extension part 340 and the lower inner surface of the side surface member 100 may be maintained in a bonded state, and thus the cosmetic container may be prevented from being damaged.

In addition, a fastening groove 360 having a ring shape may be recessed on a periphery of the bottom surface of the bottom member 300, and a fastening protrusion 420 protruding from a periphery of a top surface of the overlapping member 400 may be inserted into the fastening groove 360, so that a bonding area between the bottom member 300 and the overlapping member 400 may expand, and thus firm coupling may be achieved.

Meanwhile, the overlapping member 400 refers to a member that overlaps the bottom member 300 to allow the side surface member 100 to surround the bottom surface of the bottom member 300 when the side surface member 100 and the bottom member 300 are bonded to each other by the double injection scheme.

Since the overlapping member 400 is formed by the double injection scheme, the side surface member 100 and the bottom member 300 may be formed integrally with each other, so that molding of the cosmetic container may be completed.

The overlapping member 400 may be provided on a side surface thereof with a tapered surface 410, which has a width that is gradually narrowed toward a lower side of the overlapping member 400 and has an outer surface that is curved, and the lower inner surface of the side surface member 100 and the tapered surface 410 may be bonded to each other.

Meanwhile, as shown in FIG. 5, according to another embodiment of the present invention, a cosmetic container may include: a side surface member 100 that forms a closed curved surface shielded from an outside so as to form a predetermined reception space 101 for receiving a cosmetic product; a top surface member 200 formed integrally with the side surface member 100 on an upper portion of the side surface member 100, and including a cap coupling part 210 protruding from a center region of the top surface member 200 so as to be coupled with a cap; and a bottom member 300 disposed on a lower portion of the side surface member 100 so as to be fixed to the side surface member 100 so that the reception space 101 is shielded from the outside, wherein the bottom member 300 is drawn inward of the side surface member 100 by a predetermined interval, an overlapping member 400 that overlaps the bottom member 300 is formed by a double injection scheme to allow the side surface member 100 to surround a bottom surface of the bottom member 300, so that the bottom member 300 and the side surface member 100 are integrally formed, and a separate filling resin material 370 is applied to a top surface of the bottom member 300 so that the top surface of the bottom member 300 is smooth.

The filling resin material 370 refers to a member that is applied to the top surface of the bottom member 300 so as to be formed integrally with the bottom member 300, in which the filling resin material 370 may be applied to the top surface of the bottom member 300 so that a grid formed by the reinforcing rib 330 provided in the bottom member 300 may not be exposed to the outside.

Therefore, the grid may not be exposed to the outside due to the filling resin material 370 while the rigidity of the bottom member 300 is maintained by the reinforcing rib 330, so that when contents are drawn out to the outside of the cosmetic container for use by using a pump, it is possible to prevent a case in which the contents received in the grid may not be drawn out by the pump so as not to be used as the contents received in the cosmetic container are received in the grid.

In addition, the top surface of the bottom member 300 to which the filling resin material 370 is applied may be inclined downward toward the center region of the bottom member 300, so that the contents may be collected in the center region of the bottom member 300. Accordingly, when the contents are drawn out to the outside by using the pump, a draw-out tube of the pump may be located in the center region of the bottom member 300 to facilitate the drawing-out of the contents, and the contents may be completely used up without allowing the contents to remain.

A process of manufacturing a cosmetic container according to one embodiment of the present invention, which has the configuration described above, will be described as follows.

First, a first step S1 of molding a side surface member 100 and a top surface member 200 such that a reception space 101 is formed by using a hollow molding scheme may be performed.

Thereafter, a second step S2 of allowing a fixing bar provided in a molding device to pass through a cap coupling part 210 formed on the top surface member 200 so as to be inserted into a fixing sill 310 of a bottom member 300 to fix the bottom member 300 may be performed.

When the bottom member 300 is fixed by the fixing bar, a third step S2 of arranging the side surface member 100 such that the bottom member 300 makes contact with a lower inner surface of the side surface member 100 while the bottom member 300 is fixed may be performed.

A fourth step S4 of forming an overlapping member 400 to surround a bottom surface of the bottom member 300 to overlap the bottom member 300 when double injection is performed while the lower inner surface of the side surface member 100 makes contact with a side surface of the bottom member 300 so that the side surface of the bottom member 300 and the lower inner surface of the side surface member 100 are bonded to each other may be performed.

In addition, when the bottom member 300 and the lower inner surface of the side surface member 100 are bonded to each other, the fixing bar may be separated from the fixing sill 310, and the cosmetic container, which has been molded, may be removed from the molding device, so that the manufacture of the cosmetic container may be completed.

According to the cosmetic container and the manufacturing method thereof having the configurations described above, a bottom surface of the cosmetic container for storing a cosmetic product is formed firmly and integrally with a side surface of the cosmetic container, and rigidity of the bottom surface is improved so that the bottom surface is prevented from being damaged even when the cosmetic container is accidentally dropped, and thus the cosmetic product may be permanently received in the cosmetic container, which improves user satisfaction.

Since only some of preferred embodiments that may be implemented by the present invention have been described above, it is to be noted that the scope of the present invention should not be construed as being limited to the above embodiments, and the scope of the present invention may encompass all technical ideas having essentials of the technical idea of the present invention described above.

What is claimed is:

1. A cosmetic container comprising:
    a side surface member having a closed curved surface shielded from an outside so as to form a reception space for receiving a cosmetic product;
    a top surface member formed integrally with the side surface member on an upper portion of the side surface member, and including a cap coupling part protruding from a center region of the top surface member so as to be coupled with a cap; and
    a bottom member disposed on a lower portion of the side surface member so as to be fixed to the side surface member so that the reception space is shielded from the outside,
    wherein the bottom member is disposed inward of the side surface member by an interval, and an overlapping member overlaps the bottom member to allow the side surface member to surround a bottom surface of the bottom member, so that the bottom member and the side surface member are integrally bonded,
    wherein a fixing sill protrudes from a center region of the bottom member, and
    wherein a reinforcing rib having a grid shape protrudes by a predetermined height from a top surface of the bottom member except for an inside of the fixing sill.

2. The cosmetic container of claim 1, wherein a tapered surface having a width that is narrowed toward a lower side of the overlapping member and including an outer surface that is curved is disposed on a side surface of the overlapping member, and
    a lower inner surface of the side surface member and the tapered surface are bonded to each other.

3. The cosmetic container of claim 1, wherein an extension part extending in a height direction of the bottom member is disposed on a periphery of a top surface of the bottom member.

4. The cosmetic container of claim 3, wherein a separate reinforcing part having one side surface making contact with an inner surface of the extension part and another side surface making contact with the top surface of the bottom member is disposed on the inner surface of the extension part.

5. A cosmetic container comprising:
    a side surface member having a closed curved surface shielded from an outside so as to form a reception space for receiving a cosmetic product;
    a top surface member formed integrally with the side surface member on an upper portion of the side surface member, and including a cap coupling part protruding from a center region of the top surface member so as to be coupled with a cap; and
    a bottom member disposed on a lower portion of the side surface member so as to be fixed to the side surface member so that the reception space is shielded from the outside,
    wherein the bottom member is disposed inward of the side surface member by an interval, and an overlapping member overlaps the bottom member to allow the side surface member to surround a bottom surface of the bottom member, so that the bottom member and the side surface member are integrally bonded,
    wherein a fastening groove is recessed on a periphery of the bottom surface of the bottom member, and
    a fastening protrusion inserted into the fastening groove protrudes from a periphery of a top surface of the overlapping member.

* * * * *